United States Patent [19]

Powers

[11] 4,059,877
[45] Nov. 29, 1977

[54] METHODS FOR FORMING BUBBLE CAP ASSEMBLIES FOR A GAS AND LIQUID CONTACT APPARATUS

[75] Inventor: John R. Powers, Port Arthur, Tex.

[73] Assignee: Texaco Inc., New York, N.Y.

[21] Appl. No.: 712,451

[22] Filed: Aug. 6, 1976

[51] Int. Cl.[2] .............................................. B23P 15/00
[52] U.S. Cl. ................................. 29/157 R; 29/157.4; 261/114 A
[58] Field of Search ........................... 29/157 R, 157.4; 261/114 A; 285/205, 206, 191

[56] References Cited

U.S. PATENT DOCUMENTS

| | | | |
|---|---|---|---|
| 1,965,549 | 7/1934 | Holmes et al. | 261/114 A |
| 2,142,231 | 1/1939 | Allen | 261/114 A |
| 2,320,822 | 6/1943 | Kerrigan | 261/114 A |
| 2,382,489 | 8/1945 | Koppel | 285/205 |
| 2,480,862 | 9/1949 | Johnson | 261/114 A |
| 2,528,919 | 11/1950 | Stone et al. | 285/205 |
| 2,653,018 | 9/1953 | Dunn | 261/114 A |
| 2,658,738 | 11/1953 | Plossl et al. | 261/114 A |
| 2,785,882 | 3/1957 | Wansink et al. | 261/114 A |
| 2,797,907 | 7/1957 | DeBie | 261/114 A |
| 3,749,425 | 7/1973 | Howland | 285/191 |

FOREIGN PATENT DOCUMENTS

| | | | |
|---|---|---|---|
| 216,478 | 7/1961 | Austria | 261/114 A |

Primary Examiner—C.W. Lanham
Assistant Examiner—Daniel C. Crane

Attorney, Agent, or Firm—Carl G. Ries; Thomas H. Whaley; Theron H. Nichols

[57] ABSTRACT

Two methods are disclosed for forming two different bubble cap assemblies for mounting over holes in tray decks of a gas and liquid contact apparatus, as a fractionation tower. The basic method comprises forming an outwardly extending annular flange on the lower end of a riser having an internal diameter substantially equal to the hole diameter, inserting an annular gasket seal having an inside diameter substantially equal to the hole diameter between the riser annular flange and the upper peripheral surface around the hole in the tray deck, forming an outwardly extending annular flange on the lower end of an inner sleeve contiguous with the inner surface of the riser and hole, inserting an annular gasket seal having an inside diameter substantially equal to the hole diameter between the inner sleeve annular flange and the lower peripheral surface around the hole in the tray deck, mounting a top spider having a sleeve therein on the riser, mounting a bubble cap on the top spider, and inserting a hold-down stud up from the bottom to protrude through the top of the bubble cap, and attaching a fastening means on the top of the hold-down stud protruding from the top of the bubble cap assembly for applying pressure to both of the annular gasket seals on the upper and under peripheral surface of the hole for assuring proper alignment of the bubble cap assembly relative to the tray deck and for providing a double seal between the tray deck and the bubble cap assembly for minimizing leakage. Additional method steps are disclosed for forming a modified bubble cap assembly.

9 Claims, 5 Drawing Figures

METHODS FOR FORMING BUBBLE CAP ASSEMBLIES FOR A GAS AND LIQUID CONTACT APPARATUS

BACKGROUND OF THE INVENTION

In the chemical and petroleum refining industries, gases are contacted with liquids in a gas and liquid contact apparatus, as in a contact tower for fractionating, absorbing, scrubbing, and the like.

The two different bubble cap assemblies made by the disclosed methods are utilized in a gas and liquid contact apparatus comprising a stack of perforated trays in a tower with downcomers and weirs for flowing liquids from the top of the tower down over a tray deck to a weir, over the weir into a downcomer to the next tray deck below, and thus across and down through all trays consecutively until reaching the bottom where it is discharged, while a gas is introduced in the tower at the bottom and is forced through the holes in each tray deck covered with bubble cap assemblies which insure that all gas in each chamber has bubbled through a tray of liquid in the bottom of that chamber before passing upwardly through the next tray of liquid to exhaust out the top of the tower.

Thus as this counterflow of gas and liquid takes place, any constituents in the gas which are condensed by contact with the liquid exhaust therewith at the bottom of the tower, while any remaining unabsorbed gas and additional vapor is exhausted from the top of the tower with the gases.

Improved methods for making different bubble cap assemblies including means for mounting them on a tray of a gas and liquid contact apparatus is often highly desired. Disclosed herein are two improved methods for forming two different bubble cap assemblies.

Prior bubble cap assemblies and methods for making same are disclosed in U.S. Pat. Nos. 2,480,862; 2,653,018; 2,658,738; 2,797,907; and 2,778,621. None of these patents disclose, teach, or suggest elements like the disclosed elements of a bubble cap assembly as the inner sleeve, the riser, the top spider around the hold-down stud, at least two annular sealing gaskets around the hole on both sides of the tray deck, or the top spider having legs radiating out from a sleeve, the sleeve receiving the hold-down stud and a portion of the spider legs fitting down in the top of the riser.

OBJECTS OF THE INVENTION

Accordingly, a primary object of the invention is to provide an improved method for forming a bubble cap assembly for mounting over holes in tray decks of a gas and liquid contact apparatus with both an inner sleeve and a riser with annular flanges on each of the inner sleeve and the riser for providing a double seal between the tray deck and the bubble cap assembly for minimizing leakage.

Another primary object of this invention is to provide an improved method for forming a bubble cap assembly that assures proper alignment of the bubble cap assembly relative to the tray deck.

A further object of this invention is to provide two different methods for forming two different bubble cap assemblies.

A further object of this invention is to provide a method for forming a bubble cap assembly that is easy to operate, is of simple configuration, is economical to build and assemble, and is of greater efficiency for use in a gas and liquid contact apparatus.

Other objects and various advantages of the disclosed methods for forming two bubble cap assemblies will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, a few forms or mechanisms are carrying out the methods of the invention wherein like reference numerals have been employed to indicate similar parts in the several views in which.

DESCRIPTION OF THE INVENTION

Figure 1:
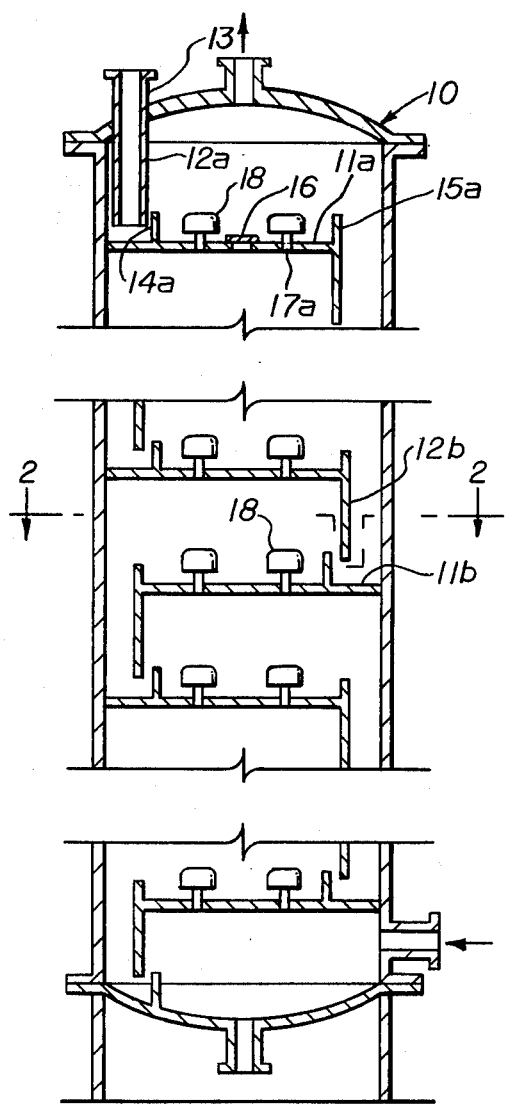
FIG. 1 is a schematic diagrammatic vertical sectional view of a fractionation tower including the invention throughout.

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises two methods for forming two different bubble cap assemblies for mounting over holes in tray decks of a gas and liquid contact apparatus.

A basic method for forming a bubble cap assembly for a gas and liquid contact apparatus as in a contact tower for fractionating, absorbing, scrubbing, and the like comprises the steps of, 1. sealing an inner sleeve with an annular flange on the bottom thereof to the bottom peripheral surface around a hole in a tray deck in the gas and liquid contact apparatus, 2. sealing a riser with an annular flange on the bottom thereof to the upper peripheral surface around the hole in the tray deck, 3. inserting a hold-down stud up through the bottom of the hole extending centrally of the inner sleeve and riser, 4. forming a top spider sleeve large enough to slide over the hold-down stud, 5. attaching equally spaced apart top spider legs to the top spider sleeve for radiating outwardly from the sleeve, 6. inserting a lower portion of each top spider leg internally of the upper end of the riser for centering the top spider over the riser, 7. forming a bell shaped bubble cap with a hole in the top thereof and with elongated slots spaced apart completely around the skirt of the bell, 8. inserting the hold-down stud up through the top spider sleeve and bubble cap hole, and 9. attaching fastening means to the top of the hold-down stud protruding through the bubble cap for centering the bubble cap and top spider over the hole and for applying pressure to both of the inner sleeve annular sealing flange and the riser annular sealing flange for sealing the hole off, for assuring proper alignment of the bubble cap assembly relative to the tray deck, and for providing a double seal between the tray deck and the bubble cap assembly for minimizing leakage.

The above basic method may be modified by adding the following steps for forming one specific type of bubble cap assembly comprising the steps of, 1. forming equally spaced apart lower spider legs radiating outwardly from the lower end of the hold-down stud beyond the outer peripheral edge of the hole, and 2. inserting an upper portion of each lower spider leg internally of the bottom of the inner sleeve whereby upon tightening of the fastening means on the top of the hold-down stud applies pressure to both of the inner sleeve annular sealing flange and the riser annular sealing flange for sealing the hole off, for assuring proper alignment of the bubble cap assembly relative to the tray deck, and for providing a double seal between the tray deck and the bubble cap assembly for minimizing leakage.

The above recited basic method may be modified further by adding the following steps for forming another specific type of bubble cap assembly comprising the steps of, 1. rigidly fastening an attachment bar transversely to the lower end of the hold-down stud, and 2. fixing the ends of the attachment bar to the inner walls of the inner sleeve whereby with tightening of the fastening means on the top of the hold-down stud applies pressure to both of the inner sleeve annular sealing flange and the riser annular sealing flange for sealing the hole off, for assuring proper alignment of the bubble cap assembly relative to the tray deck, and for providing a double seal between the tray deck and the bubble cap assembly for minimizing leakage.

DESCRIPTION OF THE TWO BUBBLE CAPS FORMED BY THE ABOVE METHODS

FIG. 1 discloses a conventional gas and liquid contact apparatus 10 but illustrated with the new invention therein. This contact apparatus 10 comprises a multiplicity of tray decks 11 stacked one above the other, each tray deck being the enantiomorphic projection of the one below. Tray deck 11a, for example, comprises a downcomer 12a which receives liquid from the top of the fractionation tower inlet 13. The liquid that passes down the downcomer enters the tray deck after passing over the first weir 14a. Then the liquid spreads out over the tray deck to a height as controlled as a far or second weir 15a on the far side of the tray deck. A manhole 16 provides access for adjustment and/or repair of the tray deck and the mechanisms mounted thereon. Vapor or gas holes 17 are formed all over the tray deck, hole 17 being a typical hole. Each of the gas holes 17 has a bubble cap assembly 18 therein for causing the gas to bubble through the liquid but preventing liquid from passing down through the hole below. A suitable frame or brace structure supports the tray deck. As liquid passes over the second weir 15a it drops down downcomer 12b to the next tray deck 11b below. The principal feature of this disclosure is the bubble cap assembly 18 as illustrated in greater detail in FIGS. 2-4.

Figure 2:
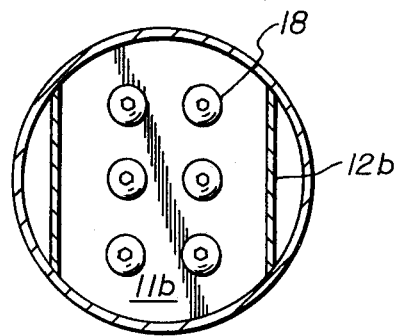
FIG. 2 is a sectional view taken at 2—2 on FIG. 1.

FIG. 2, a horizontal sectional view at 2—2 on FIG. 1 illustrates a typical tray deck 11b with six typical bubble cap assemblies 18 and downcomer 12b.

Figure 3:
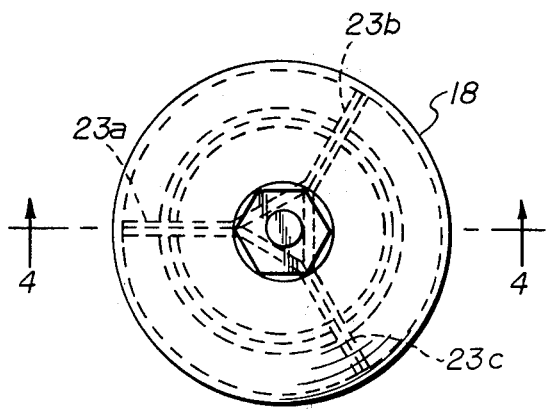
FIG. 3 is a top view of a bubble cap assembly.
Figure 4:
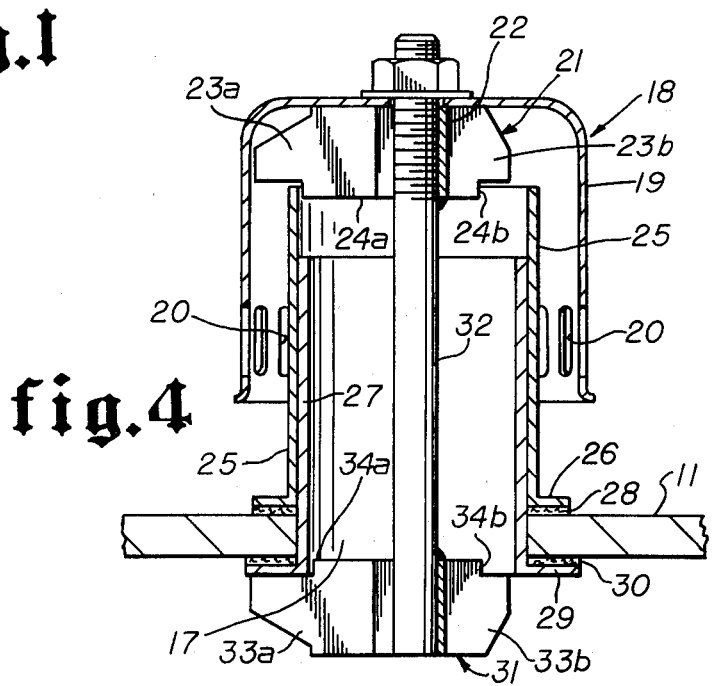
FIG. 4 is a vertical sectional view taken at 4—4 on FIG. 3.

FIG. 3 is a top view of the bubble cap assembly of FIG. 4.

FIG. 4 discloses a bubble cap assembly 18 which fills the hole to allow gas to pass up from the tray deck below up through this bubble cap assembly, through the liquid and then allows the gas to bubble up to the surface of the liquid and up through the tray deck above. A bell-shaped bubble cap 19 with slots 20 in the skirt for allowing the gas to bubble out or pass out from inside the bell to the liquid outside. Bubble cap 19 rests on or is supported by spider 21. This spider comprises a sleeve 22 with three equally spaced arms 23a, 23b, and 23c fixed thereto and radiating outwardly therefrom. Arms 23a-23c have a portion 24a-24c on each fitted down internally of a riser 25 for centering the spider and the bubble cap thereover.

With the spider 21 and bell-shaped bubble cap 18a resting on the top of riser 25, the bottom of the riser rests on the upper surface of the peripheral edge of a hole 17a. This bottom portion of the riser comprises an annular flange 26 formed on the outer surface at the lower end of the riser for resting on top of the tray deck around the hole. A gasket is positioned between this annular flange and the tray deck. An inner sleeve 27 is formed internally of the riser 25 and contiguous with the inner surface thereof for extending down below the riser internally of the hole and protruding slightly down below the hole. Another annular flange 29 is formed on the protruding portion of the inner sleeve 27 and extends outwardly of the inner sleeve contiguous with the lower or under surface of the tray deck 11 around the peripheral edge of the hole. Between this flange 29 and the tray deck is positioned another annular gasket 30. Under the bottom of the hole is a lower spider 31 formed integral with a stud 32. This lower spider likewise is formed with three protruding or radiating arms from the lower end of the stud.

While any number of arms may be utilized as for the lower spider, three are preferred as described and illustrated herein. Lower spider 31 has arms 33a, 33b, and 33c (not shown in FIG. 4), each having a portion 34a, 34b, and 34c, protruding up into the lower end of the inner sleeve 27. These protruding portions of the lower spider center the spider as well as the lower end of the stud 32 to which the spider is securely fastened. The stud 32 extends from the bottom of the hole up through the bubble cap assembly including the sleeve 22 of the upper spider and then as protruding through the bubble cap. A fastening device such as but not limited to a nut and washer are screwed on to the top thereof for compressing all parts of the assembly together. With compression placed on all parts, particularly the riser and inner sleeve annular flanges, the gasket thereunder is then compressed into a liquid sealing position and condition.

Figure 5:
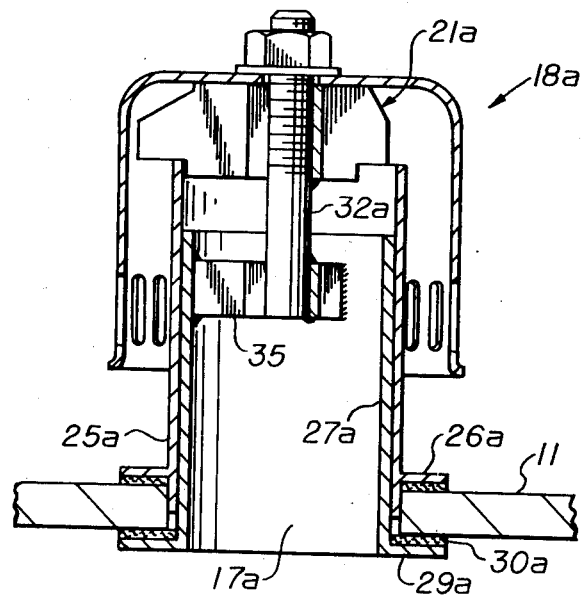
FIG. 5 is a modification of FIG. 4.

FIG. 5 illustrates a modified bubble cap assembly 18a. Here, the bubble cap portion of the bubble cap assembly is similar to the first embodiment, as is the supporting upper spider 21a. The riser 25a of the second embodiment protrudes down internally of the hole 17a with its annular flange 26a secured and made integral with the riser at a spaced distance slightly above the bottom edge of the riser. This annular flange 26a likewise rests on and is sealed to the upper peripheral edge of the hole in the deck tray 11. The inner sleeve 27a of this embodiment lies internally and contiguous with the inner surface of the riser 25a and protrudes down through the hole and ends with an annular flange 29a formed integral therewith, which flange protrudes out and is sealed with a sealing gasket 30a to the peripheral lower edge surface of the hole 17a in the tray deck. An attachment bar 35 is welded to the inner surface of the inner sleeve 27a and likewise the attachment bar is secured to the bottom of the stud 32a whereby tightening of the nut on the upper end of the stud compresses the assembly together to form a second fluid-tight bubble cap assembly 18a.

Obviously other methods may be utilized for forming bubble cap assemblies.

Accordingly, it will be seen that at least two methods are disclosed for forming two embodiments of a bubble cap assembly that will operate in a manner which meets each of the objects set forth hereinbefore.

While only two methods of the invention for forming two mechanisms have been disclosed, it will be evident that various other modifications are possible in the arrangement and construction of the disclosed methods for forming bubble cap assemblies without departing from the scope of the invention and it is accordingly desired to comprehend within the purview of this invention such modifications as may be considered to fall within the scope of the appended claims.

I claim:

1. A method for forming a bubble cap assembly over a hole having upper and lower peripheral surfaces in a tray deck of a gas and liquid contact apparatus comprising the steps of,
   a. forming an outwardly extending annular flange on the lower end of a tubular riser having an internal diameter substantially equal to the hole diameter,
   b. positioning the riser over the upper peripheral surface of the hole in the tray deck,
   c. inserting an annular gasket seal having an inside diameter substantially equal to the hole diameter between the riser annulus flange and the upper peripheral surface around the hole in the tray deck,
   d. forming an outwardly extending annular flange on the lower end of an inner tubular sleeve,
   e. inserting an annular gasket seal having an inside diameter substantially equal to the hole diameter on top of the inner sleeve annular flange,
   f. inserting the inner sleeve up through the hole in the tray deck and the riser thereon contiguous with the inner surface of the riser and hole to clamp the upper and lower peripheral surfaces of the tray deck between the respective riser and inner sleeve annular flanges,
   g. mounting a top spider having a sleeve therein on the riser,
   h. mounting a bubble cap on the top spider,
   i. inserting a hold-down stud having a lower spider up through the inner sleeve and the riser to protrude through the top of the bubble cap, and
   j. attaching a fastening means on the top of the hold-down stud protruding from the top of the bubble cap assembly for applying pressure to both of the annular gasket seals on the upper and lower peripheral surfaces of the hole for assuring proper alignment of the bubble cap assembly relative to the tray deck and for providing a double seal between the tray deck and the bubble cap assembly for minimizing leakage.

2. A method as recited in claim 1 wherein the method for forming the top spider comprises,
   a. forming a sleeve of a size large enough for passing the hold-down stud through,
   b. rigidly securing spider legs to the sleeve to radiate outwardly therefrom, and
   c. inserting a portion of each spider leg internally of the uper end of the riser for centering the hold-down stud and bubble cap over the hole in the tray deck of the bubble tower.

3. A method as recited in claim 1 wherein the method of forming the hold-down stud comprises,
   a. rigidly fastening the lower end of an elongated stud to the inner sleeve,
   b. extending the elongated stud up centrally of the inner sleeve, the riser, the sleeve of the top spider, and the bubble cap,
   c. attaching a fastening means to the upper end of the elongated stud, and
   d. applying pressure to both of the annular gasket seals on the upper and under peripheral surfaces of the hole by tightening the fastening means for assuring proper alignment of the bubble cap assembly relative to the tray deck and for providing a double seal between the tray deck and the bubble cap assembly for minimizing leakage.

4. A method as recited in clam 3 comprising the additional method steps of,
   a. rigidly fastening spider legs to the lower end of the elongated stud for radiating outwardly from the stud, and
   b. inserting a portion of each radiating spider leg internally of the lower end of the inner sleeve for generating tension forces in the elongated hold-down stud between the inner sleeve and the bubble cap.

5. A method as recited in claim 3 comprising the additional method steps of,
   a. rigidly fastening an attachment bar to the internal surfaces of the inner sleeve, and
   b. securing the attachment bar to the lower end of the hold-down stud for applying tension forces in the elongated hold-down stud between the inner sleeve and the bubble cap.

6. A method for forming a bubble cap assembly over a hole having upper and lower peripheral surfaces in a tray deck of a gas and liquid contact apparatus comprising the steps of,
   a. sealing an inner tubular sleeve with an annular flange on the bottom thereof to the bottom peripheral surface around the hole in the tray deck in the gas and liquid contact apparatus,
   b. sealing a tubular riser with an annular flange on the bottom thereof to the upper peripheral surface around the hole in the tray deck,
   c. inserting the inner sleeve up through the hole in the tray deck and the riser thereon contiguous with the inner surface of the riser and hole to clamp the upper and lower peripheral surfaces of the tray deck between the respective riser and inner sleeve annular flanges, d. inserting a hold-down stud up through the bottom of the hole extending centrally of the inner sleeve and riser,
e. forming a top spider sleeve large enough to slide over the hold-down stud,
f. attaching equally angularly spaced apart top spider legs to the top spider sleeve for radiating outwardly from the spider sleeve,
g. inserting a lower portion of each top spider leg internally of the upper end of the riser for centering the top spider over the riser,
h. forming a bell shaped bubble cap with a hole in the top thereof and with elongated slots spaced apart completely around the skirt of the bell,
i. lowering the bubble cap down over the hold-down stud, and
j. attaching fastening means to the top of the hold-down stud protruding through the bubble cap for centering the bubble cap and top spider over the hole and for applying pressure to both of the inner sleeve annular sealing flange and the riser annular sealing flange for sealing the hole off, for assuring proper alignment of the bubble cap assembly relative to the tray deck, and for providing a double seal between the tray deck and the bubble cap assembly for minimizing leakage.

7. A method as recited in claim 6 comprising the added method step of,
a. forming the walls of the riser contiguous with the walls of the inner sleeve, and
b. extending the riser walls higher than the inner sleeve walls for contact with the top spider and for being penetrated by lower portions of the top spider legs.

8. A method as recited in claim 6 including the additional method steps of,
a. forming equally angularly spaced apart lower spider legs radiating outwardly from the lower end of the hold-down stud beyond the outer peripheral edge of the hole, and
b. inserting an upper portion of each lower spider leg internally of the bottom of the inner sleeve whereby upon tightening of the fastening means on the top of the hold-down stud applies pressure to both of the inner sleeve annular sealing flange and the riser annular sealing flange for sealing the hole off, for assuring proper alignment of the bubble cap assembly relative to the tray deck, and for providing a double seal between the tray deck and the bubble cap assembly for minimizing leakage.

9. A method as recited in claim 6 comprising the additional method steps of,
a. rigidly fastening an attachment bar transversely to the lower end of the hold-down stud, and
b. fixing the ends of the attachment bar to the inner walls of the inner sleeve whereby with tightening of the fastening means on the top of the hold-down stud applies pressure to both of the inner sleeve annular sealing flange and the riser annular sealing flange for sealing the hole off, for assuring proper alignment of the bubble cap assembly relative to the tray deck, and for providing a double seal between the tray deck and the bubble cap assembly for minimizing leakage.

* * * * *